United States Patent Office 2,956,955

Patented Oct. 18, 1960

2,956,955

FERROMAGNETIC CHROMIUM OXIDE AND METHOD OF MAKING

Paul Arthur, Jr., Wilmington, Del., assignor to E. I. du Pont de Nemours and Company, Wilmington, Del., a corporation of Delaware No Drawing. Filed Feb. 12, 1960, Ser. No. 8,244

16 Claims. (Cl. 252—62.5)

This invention relates to ferromagnetic materials and their preparation. More particularly, it relates to a new form of ferromagnetic chromium oxide, to a method for its preparation and to magnetic recording members having this new form of ferromagnetic chromium oxide as the magnetic track.

Ferromagnetic materials are useful in a variety of applications. For example, these materials are employed in magnetic sound recording tapes, drums and records, memory devices, microwave circuitry, and as magnetic cores, such as coil cores in electronic equipment. In some of these applications, especially those requiring magnetic materials of low loss characteristics at high frequencies, or of relatively high coercive force, ferromagnetic oxides are normally more useful than ferromagnetic metals. Heretofore, only cobalt, nickel, or iron alloys, or magnetic iron oxides have been used in the manufacture of magnetic recording tapes.

Among the known ferromagnetic oxides is chromium dioxide. However, the heretofore known forms of this oxide have not possessed the magnetic properties and uniform small particle size which would make them useful in certain practical applications, e.g., in the manufacture of magnetic recording tapes, magnetic memory cores for computers, gyrator elements, etc.

Furthermore, the known methods of preparing ferromagnetic chromium dioxide have not produced a dioxide having essentially only the tetragonal crystal structure. The hitherto known products have exhibited X-ray diffraction bands produced by other crystal structures.

The present application is a continuation-in-part of my copending application Serial No. 515,521, filed June 14, 1955, now abandoned.

It is an object of this invention to provide a new form of ferromagnetic chromium oxide and a method for its preparation. A further object is to provide a new form of ferromagnetic chromium oxide which is especially useful in the manufacture of magnetic recording tapes and in the manufacture of ceramic bodies such as magnetic cores. Another object is to provide a magnetic recording member having a magnetic track comprising this new form of ferromagnetic chromium oxide. Other objects will appear hereinafter.

These and other objects of this invention are accomplished by providing ferromagnetic chromium oxides consisting essentially of uniform small particles of tetragonal crystal structure whose average length is not more than 10 microns with no more than 10% of the particles being longer than 10 microns, the said oxides containing 58.9 to 61.9% chromium, and exhibiting an X-ray diffraction pattern which analysis shows to correspond in its entirety to a tetragonal crystal structure having cell constants of $a_0=4.41\pm0.10$ A. and $c_0=2.90\pm0.10$ A.

It has now been found that the novel ferromagnetic chromium oxides of this invention have useful magnetic and physical properties. These new ferromagnetic chromium oxides are particularly useful as the magnetic material in magnetic recording members which comprise a carrier, such as a tape, drum or record of non-magnetic material having bonded thereto a magnetic track of magnetic material and a binder therefor.

The process of making the products of this invention comprises heating chromium trioxide, $CrO_3$, at a temperature within the range of 400° to 525° C. under a pressure of at least 500 atmospheres and in the presence of water, and separating and drying the resulting chromium oxide having the above-defined characteristics.

As indicated above, the ferromagnetic chromium oxides of this invention possess a number of properties or characteristics which makes them especially suitable for use in a variety of applications. In addition to their being of very uniform particle size, the average length being less than 10 microns with not more than 10% of the particles having lengths greater than this, which enables them to form more uniform coatings when they are applied to a substrate, these chromium oxide particles also possess an elongated or acicular shape. They have an average axial ratio, i.e., a ratio of length of particle to its width or thickness, of from 2:1 to 6:1. This elongated shape of the particles makes them particularly well adapted for use in coating compositions to be applied on film or tape. This elongated shape permits the individual particles to be oriented in closer relationship during the mechanical spreading of the composition in thin layers on the substrate. This in turn results in obtaining a more uniform layer of the magnetic material on the substrate.

The tetragonal crystal structure of the chromium oxide of this invention is of the rutile type, i.e., it has the same type of crystal structure as rutile, $TiO_2$. While chromium oxides of this same crystal structure have been described previously, they have always been accompanied by chromium oxides of other composition and crystal structure. In contrast, the chromium oxide of this invention is substantially of the rutile structure as shown by its X-ray diffraction pattern. In the ideal rutile lattice, there would be one chromium atom for each two oxygen atoms, and in such a crystal lattice the chromium content of the crystal is calculated to be 61.9% chromium. However, on analysis, the chromium oxides of this invention usually contain 59.5 to 61.9% chromium. This indicates that there is a chromium deficiency in the crystal lattice, i.e., a small number of the chromium atoms required for an ideal tetragonal crystal lattice is missing.

One particular magnetic property exhibited by the chromium oxides of this invention, and which is especially valuable in applications such as magnetic recording tapes, is their exceptionally high maximum induction, $B_m$. Definitions of the magnetic terms and symbols used herein are given in Special Technical Publication No. 85 of the American Society for Testing Materials entitled "Symposium on Magnetic Testing" (1948), pages 191–198. In the manufacture of magnetic recording tapes, it is desirable to use a magnetic material having as high a maximum induction value as possible. The chromium oxides of this invention possess exceptionally high maximum induction, $B_m$, values ranging from 4780 to 5700 gauss being characteristic. Chromium oxides having $B_m$ values of 5300 and more are especially suitable for use in magnetic recording tapes, and they are a preferred group of the products of this invention. The best of the hitherto known ferromagnetic oxides employed in magnetic recording tapes are the iron oxides, and they exhibit maximum induction values of only up to about 4000 gauss.

Another magnetic property which is useful in determining to suitability of a ferromagnetic material for a particular use is the ratio of the residual induction, $B_r$, to the maximum induction, $B_m$. The chromium oxides of this invention possess $B_r/B_m$ ratios of at least 0.17 and most of them are greater than 0.20, which makes them especially valuable for use in magnetic recording tapes, drums and the like.

The valvues of $B_m$ and $B_r$ for the ratios of $B_r/B_m$ contained herein are obtained by means of a cathode ray magnetization curve tracer. An instrument of this type and its method of operation are described in detail by Scherb in the Review of Scientific Instruments, 19, 411–419 (1948). The $B_m$ values for the chromium oxides given herein relative to iron oxide as determined to have a $B_m$ value of 4000 gauss were obtained on apparatus similar to that described by P. R. Bardell on pp. 226–228 of "Magnetic Materials in Electrical Industry," Philosophical Library, New York (1955).

The acicular chromium oxide of this invention has a Curie temperature (i.e., the temperature above which the spontaneous magnetic moment vanishes) of 124° C.

Another magnetic property which is useful in evaluating the suitability of particular ferromagnetic materials for certain uses is the intrinsic coercive force, $H_{ci}$. The chromium oxides of this invention exhibit intrinsic coercive forces of at least 35 oersteds ranging upwards to 60 oersteds and even higher when applied as the magnetic material on recording tapes. The values for the intrinsic coercive forces given herein were determined by a modified form of the apparatus described by Davis and Hartenheim in The Review of Scientific Instruments, 7, 147 (1936).

The process of this invention is carried out in a corrosion-resistant container, i.e., a container constructed of a material which is inert to the reactants under the reaction conditions, e.g., platinum. The container can be a completely sealed tube having flexible walls, or it can be a vessel permitting transmission of the desired pressure to the reaction system such as a cylindrical tube closed at one end but equipped at the other with a closely fitting piston. The container is charged with chromium trioxide and water. Various proportions of water and chromium trioxide can be used, an excess of either being operable. However, certain magnetic properties, e.g., coercive force and maximum induction, are dependent upon the $CrO_3:H_2O$ ratio. Amounts of water ranging from 0.1 to 6.0 times the weight of chromium trioxide charged are operable, amounts ranging from 0.2 to 1.25 times the weight of chromium trioxide being preferred.

After the corrosion-resistant container is charged with the chromium trioxide and the water, it is closed and placed inside a larger water-filled vessel capable of withstanding high temperatures and pressures. The outer vessel is then closed and the water pressure is raised to at least 500 atmospheres. Satisfactory results are obtained with pressures ranging from 500 to 300 atmospheres. Pressures above 3000 atmospheres can be used if the available equipment is strong enough to withstand such pressures. The reaction vessel is then heated to a reaction temperature between 400° to 525° C., preferably between 450 and 475° C. Temperatures above 525° C. are not desirable since they cause decomposition of the ferromagnetic chromium oxide.

The reaction times are not critical; periods ranging from a few minutes, e.g., 5 minutes, to an hour or more at the reaction temperature of 400° to 525° C. are sufficient. Longer times are not necessary to form the the chromium oxides of this invention. Likewise, the time of heating the reaction vessel to the reaction temperature and the time of cooling it back after the reaction is completed can vary considerably, depending on the size of the vessel and charge and on the capacity of the heating and cooling equipment. However, it is preferred that heating to a reaction temperature be completed in less than one hour, and cooling back to room temperature be completed in less than 24 hours.

After the reaction mixture has been heated to the desired operating temperature for the desired time, the entire reaction vessel is cooled, e.g., by an air blast, with the operating pressure maintained until room temperature (ca. 25° C.) is reached. The water pressure is then released carefully. This depressuring results in the reaction container being ruptured by the by-product oxygen present in the container. The resulting finely divided, black, acicular chromium oxide is separated from a dark-colored aqueous phase by filtration, and is then washed with water and dried. It is often convenient to follow the water washing of the chromium oxide particles by a wash with a water-miscible volatile organic solvent, e.g., acetone and then air-dry the product. The chromium oxide produced under the above-defined operating conditions contains from about 59.5 to 61.9% chromium.

The chromium trioxide used in the process of this invention can be commercially available material of good quality. It does not need to be especially purified for use.

The invention is illustrated in further detail by the following examples in which the proportions of ingredients are expressed in parts by weight unless otherwise noted.

*Example I*

A platinum tube 7/16" in diameter and 5½" long sealed at one end is charged with 12 g. of chromium trioxide and sufficient water to fill the tube to within ½" of the top. A closely fitting platinum piston ¼" thick is inserted in the top of the tube and pressed down until water seeps around the edges. The tube is then completely filled with water and a closely fitting platinum cap is placed over it. The closed tube is then placed in a water-filled metal bomb where it is heated to 475° C. at 3000±150 atmospheres pressure for three hours. After cooling and depressuring, the bomb is opened and the reaction product is removed from the platinum tube. There is isolated by filtration, followed by washing with water and finally by acetone and air drying, 8.4 g. of black, finely divided magnetic chromium oxide. These particles have a uniform size, their transverse dimensions ranging from 0.4 to 1 micron and their length ranging from 1 to 3 microns. On analysis this product is found to contain 61.76% chromium. The theoretical chromium content for chromium dioxide is 61.91%. This chromium oxide has the following magnetic properties:

| | |
|---|---|
| Coercive force, $H_{ci}$ ____oersteds__ | 47 |
| $B_r/B_m$ ____ | 0.25 |

*Example II*

A flexible platinum tube of 140 cc. capacity is charged with 150 g. of chromium trioxide and 18.75 g. of distilled water. The platinum tube is sealed by welding and is then placed in a water-filled metal bomb and subjected to a temperature of 450° C. and 1000±100 atmospheres pressure for one-half hour. The bomb is then cooled in a blast of air, but 1000 atmospheres pressure is maintained in the bomb until room temperature is reached. The bomb is then opened and the product is removed from the platinum tube and the filtered solid is washed thoroughly with hot and cold water and finally by a rinse with acetone. The product is air-dried and amounts to 125.5 g., corresponding to a 99% yield of chromium oxide. The particles have transverse dimensions ranging from 1 to 3 microns, and lengths ranging from 3 to 10 microns. The axial ratio of the particles is very uniform and amounts to about 3:1.

*Analysis.*—Calcd. for $CrO_2$: Cr, 61.91%. Found: Cr, 61.94, 61.95%.

The product has the following magnetic properties:

| | |
|---|---|
| Coercive force, $H_{ci}$ ____oersteds__ | 41 |
| $B_r/B_m$ ____ | 0.18 |
| $B_m$ (approx.) ____gauss__ | 5350 |

*Example III*

A 3½" section of ⅜" outside diameter platinum tubing is sealed at one end by welding. This tube is then charged with 2.25 g. of chromium trioxide and 0.95 g. of water and is then sealed at the other end. The tube is placed in a water-filled metal bomb and heated to a temperature of 400° C. at 500±50 atmospheres pressure for three hours. The pressure is maintained at 500 atmospheres until the bomb is cooled to room temperature. When the bomb is opened, the tube is found to be ruptured (probably occurring during the decompression at room temperature) and is found to have lost 0.3222 g. in weight. The black reaction product is removed, ground in an agate mortar, washed with water, boiled several times with water, and finally rinsed with water and acetone. The amount of air-dried product obtained is 1.15 g. (60.7% yield). An duplicate run in which the platinum reaction tube was not ruptured is found to yield 1.68 g. of product, corresponding to an 89% yield. The chromium oxide obtained has the following magnetic properties:

| | |
|---|---|
| Coercive force, $H_{ci}$ ----------oersteds-- | 79.5 |
| $B_r/B_m$ ---------------------------- | 0.25 |
| $B_m$------------------------gauss-- | 5350 |

*Example IV*

A platinum tube 7/16" in diameter and 5½" long having walls 10 mils thick is charged with 2.00 g. of chromium trioxide and sufficient water to almost completely fill the tube. A platinum piston ¼" thick fitting snugly inside the tube is positioned about one inch below the open top. The tube is then completely filled with water and a snap-fitting platinum cap is used to close the tube. The total amount of water in the tube is 11.8 cc. The closed tube is then placed in a metal vessel capable of withstanding high pressures and is pressured to 1000 atmospheres with water. The reaction vessel is heated up to 475° C. over a period of 50 minutes. During this heating the autogenous pressure (due to water expansion) is relieved ten times by bleeding from 2200 atmospheres to 1900 atmospheres pressure. The reaction vessel is maintained at 1900–2200 atmospheres pressure for one hour at 475° C. After the reaction vessel is allowed to cool to room temperature slowly, the bomb is opened and the solid reaction product is isolated by filtration and washing with water. The resulting product is a black powder which is completely and strongly attracted by a magnet. A yield of 0.75 g., corresponding to 44.6% of theory, of chromium oxide is obtained. Electron microscope examination of this product shows particles having transverse dimensions of 0.5 to 2 microns with length from 2 to 6 times their width. The product has an intrinsic coercive force, $H_{ci}$, of 41 oersteds.

*Analysis.*—Calcd. for $CrO_2$: Cr, 61.91%. Found: Cr, 60.79, 61.04%.

The product exhibits an X-ray diffraction pattern having the reflection lines listed in the following table. These lines define a tetragonal crystal structure having cell constants of $a_0$=4.429 and $c_0$=2.905. In the table the column headed "d" gives the interplanar spacings in angstrom units, and the column headed "I" gives the relative reflection intensities of the reflections. In the medium intensities the numbers 1 to 4 indicate relative intensities within this range, 1 being strongest and 4 being weakest.

| d | I | d | I |
|---|---|---|---|
| 3.11 | medium 1. | 1.39 | medium 4. |
| 2.43 | medium 3. | 1.31 | medium 2. |
| 2.21 | faint. | 1.13 | medium 4. |
| 2.13 | medium 4. | 1.06 | faint. |
| 1.97 | very faint. | 1.04 | faint. |
| 1.63 | strong. | 1.01 | medium 4. |
| 1.56 | medium 3. | 0.95 | faint. |
| 1.46 | medium 4. | | |

*Example V*

A flexible platinum tube is charged with 150 g. of chromium trioxide and 18.75 g. of water, the tube is heated at 450° C. under 1000 atmospheres pressure for 0.5 hour, and the product is worked up in the manner described in Example II. There is obtained 125.5 g. of finely divided chromium oxide. This product has a coercive force, $H_{ci}$, of 36 oersteds.

A dispersion of these chromium oxide particles with a nitrocellulose binder is coated in a uniform layer on a cellulose acetate tape. After drying, the coated tape has a thickness of about 2 mils, and the magnetic coating is about 0.5 mil thick. The coercive force of the magnetic coating on the tape is found to be 94 oersteds. This tape is suitable for use as a magnetic recording tape.

The chromium oxides of this invention, having a uniform small particle size, a tetragonal crystal structure, and a chromium content within 3% of that of the theoretical for chromium dioxide, are well suited for use in various applications. One application in which they are especially valuable is the magnetic coating for magnetic recording tapes, drums and records. Their value for this particular purpose is quite unexpected in view of the teaching of the prior art that magnetic oxides, particularly iron oxide, suitable for use in this application must have an intrinsic coercive force of between 200 and 550 oersteds. In contrast to this teaching, the chromium oxides of this invention, having intrinsic coercive forces of 35 to 100 oersteds, give good results when used as the magnetic component of recording tapes.

The chromium oxides of this invention are also useful in a wide variety of other applications, especially in the manufacture of ceramic bodies such as magnetic cores. More particularly they are useful in magnetic memory cores for computers, in microwave attenuators, in gyrator elements, in electrically operated high frequency switches, in low-loss transformer cores for megacycle/second frequency ranges, in focusing magnets, and in magnetic clutches.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A ferromagnetic composition of uniform small particles of ferromagnetic chromium oxide consisting entirely of tetragonal crystal structure having an average length of not more than 10 microns with no more than 10% of said particles being longer than 10 microns, the said ferromagnetic chromium oxide particles containing by analysis 58.9 to 61.9% chromium and when exposed to X-rays exhibiting an X-ray diffraction pattern which in its entirety corresponds to a tetragonal crystal structure having cell constants of $a_0$=4.41±0.10 A. and $$c_0=2.90\pm0.10 \text{ A.}$$

2. A ferromagnetic composition of uniform small particles of ferromagnetic chromium oxide consisting entirely of tetragonal crystal structure having an acicular shape with a ratio of length to width of from 2:1 to 6:1 and an average length of not more than 10 microns with no more than 10% of said particles being longer than 10 microns, the said ferromagnetic chromium oxide particles containing by analysis 59.5 to 61.9% chromium and when exposed to X-rays exhibiting an X-ray diffraction pattern which in its entirety corresponds to a tetragonal crystal structure having cell constants of $a_0$=4.41±0.10 A. and $c_0$=2.90±0.10 A.

3. A ferromagnetic composition of uniform small particles of ferromagnetic chromium oxide consisting entirely of tetragonal crystal structure as set forth in claim 1, in which said ferromagnetic chromium oxide particles contain by analysis from 59.5 to 61.9% chromium.

4. A ferromagnetic composition of uniform small particles of ferromagnetic chromium oxide consisting entirely of tetragonal crystal structure as set forth in claim 1, in which said ferromagnetic chromium oxide particles have a ratio of the residual induction to the maximum induction $B_r/B_m$ of at least 0.20.

5. A ferromagnetic composition of uniform small particles of ferromagnetic chromium oxide consisting entirely of tetragonal crystal structure as set forth in claim 1, in which said ferromagnetic chromium oxide particles have an intrinsic coercive force of at least 41 oersteds.

6. A magnetic recording member comprising a carrier of non-magnetic material having bonded thereto a magnetic track of a ferromagnetic composition of uniform small particles of ferromagnetic chromium oxide consisting entirely of tetragonal crystal structure, said chromium oxide particles having an acicular shape and an average length of not more than 10 microns with no more than 10% of said particles being longer than 10 microns, the said ferromagnetic chromium oxide particles containing by analysis 58.9 to 61.9% chromium and when exposed to X-rays exhibiting an X-ray diffraction pattern which in its entirety corresponds to a tetragonal crystal structure having cell constants of $a_0$=4.41±0.10 A. and $c_0$=2.90±0.10 A.

7. A magnetic recording member comprising a carrier of non-magnetic material having bonded thereto a magnetic track of a ferromagnetic composition of uniform small particles of ferromagnetic chromium oxide consisting entirely of tetragonal crystal structure, said chromium oxide particles having an acicular shape with a ratio of length to width of from 2:1 to 6:1 and an average length of not more than 10 microns with no more than 10% of said particles being longer than 10 microns, the said ferromagnetic chromium oxide particles containing by analysis 59.5 to 61.9% chromium and when exposed to X-rays exhibiting an X-ray diffraction pattern which in its entirety corresponds to a tertagonal crystal structure having cell constants of $a_0$=4.41±0.10 A. and $c_0$=2.90±0.10 A.

8. A magnetic recording member comprising a carrier of non-magnetic material having bonded thereto a magnetic track of a ferromagnetic composition of uniform small particles of ferromagnetic chromium oxide having an acicular shape and consisting entirely of tetragonal crystal structure as set forth in claim 6, in which said ferromagnetic chromium oxide particles contain by analysis from 59.5 to 61.9% chromium.

9. A magnetic recording member comprising a carrier of non-magnetic material having bonded thereto a magnetic track of a ferromagnetic composition of uniform small particles of ferromagnetic chromium oxide having an acicular shape and consisting entirely of tetragonal crystal structure as set forth in claim 6, in which said ferromagnetic chromium oxide particles have a ratio of the residual induction to the maximum induction $B_r/B_m$ of at least 0.20.

10. A magnetic recording member comprising a carrier of non-magnetic material having bonded thereto a magnetic track of a ferromagnetic composition of uniform small particles of ferromagnetic chromium oxide having an acicular shape and consisting entirely of tetragonal crystal structure as set forth in claim 6, in which said ferromagnetic chromium oxide particles have an intrinsic coercive force of at least 41 oersteds.

11. Process for preparing ferromagnetic chromium oxide which comprises heating chromium trioxide in water at a temperature within the range of 400° to 525° C. under a pressure of at least 500 atmospheres, and separating and drying as the resulting product a ferromagnetic chromium oxide containing by analysis 58.9 to 61.9% chromium and when exposed to X-rays it exhibits an X-ray diffraction pattern which in its entirety corresponds to a tetragonal crystal structure having cell constants of $a_0$=4.41±0.10 A. and $c_0$=2.90±0.10 A.

12. Process for preparing ferromagnetic chromium oxide as set forth in claim 11, in which said chromium trioxide is heated in water at a temperature within the range of 450° to 475° C. under said pressure of at least 500 atmospheres.

13. Process for preparing ferromagnetic chromium oxide as set forth in claim 11, in which said chromium trioxide is heated in an amount of water of from 0.1 to 6.0 times the weight of said chromium trioxide.

14. Process for preparing ferromagnetic chromium oxide as set forth in claim 11, in which said chromium trioxide is heated in an amount of water of from 0.2 to 1.25 times the weight of said chromium trioxide.

15. Process for preparing ferromagnetic chromium oxide which comprises heating chromium trioxide in water at a temperature within the range of 400° to 525° C. under a pressure of 500 to 3000 atmospheres, cooling the reaction mixture to room temperature of about 25° C. while maintaining pressure thereon of at least 500 atmospheres, then reelasing said pressure, and separating and drying as the resulting product a ferromagnetic chromium oxide containing by analysis 59.5 to 61.9% chromium and when exposed to X-rays it exhibits an X-ray diffraction pattern which in its entirety corresponds to a tetragonal crystal structure having cell constants of $a_0$=4.41±0.10 A. and $c_0$=2.90±0.10 *A*.

16. A ferromagnetic composition of uniform small particles of ferromagnetic chromium oxide consisting entirely of tetragonal crystal structure having an acicular shape with a ratio of length to width of from 2:1 to 6:1 and an average length of not more than 10 microns with no more than 10% of said particles being longer than 10 microns, the said ferromagnetic chromium oxide particles containing by analysis 58.9 to 61.9% chromium and when exposed to X-rays exhibiting an X-ray diffraction pattern with characteristic lines at 3.11, 1.63 and 1.31 Angstrom units and which in its entirety corresponds to a tetragonal crystal structure having cell constants of $a_0$=4.41±0.10 A. and $c_0$=2.90±0.10 A.

References Cited in the file of this patent

UNITED STATES PATENTS

| | | |
|---|---|---|
| 2,694,656 | Camras | Nov. 16, 1954 |
| 2,770,523 | Toole | Nov. 13, 1956 |

OTHER REFERENCES

Laubengayer et al.: J. Amer. Chem. Soc., vol. 74 pp. 2362, 2363, May 5, 1952.

Guillaud et al.; Comptes Rendus, vol. 219, pp. 58–60, July 10, 1944.